United States Patent [19]

Frey et al.

[11] Patent Number: 5,263,740
[45] Date of Patent: Nov. 23, 1993

[54] HYBRID AIR BAG INFLATOR

[75] Inventors: Stuart M. Frey, Bloomfield Hills, Mich.; Paul S. Headley, Glendale, Ariz.; John H. Semchena, Royal Oak, Mich.; Richard J. Thompson, Imlay City, Mich.; Ernst M. Faigle, Imlay City, Mich.; Gregory B. Grace, Gilbert, Ariz.

[73] Assignee: TRW Inc., Lyndhurst, Ohio

[21] Appl. No.: 809,738

[22] Filed: Dec. 17, 1991

[51] Int. Cl.⁵ ............................................. B60R 21/26
[52] U.S. Cl. ................................... 280/737; 280/741; 102/202.14
[58] Field of Search ............... 102/202, 202.14, 530, 102/531; 60/256; 422/164, 165, 166; 280/736, 741, 742, 737, 728, 728 R; 222/3, 5

[56] References Cited

U.S. PATENT DOCUMENTS

| | | |
|---|---|---|
| 2,400,103 | 5/1946 | Cobb .................. 102/202.14 |
| 2,423,837 | 7/1947 | Martin ...................... 102/204 |
| 3,132,585 | 5/1964 | Higashishima et al. ....... 102/202.14 |
| 3,180,373 | 4/1965 | Hebenstreit ................. 222/5 |
| 3,256,056 | 6/1966 | Armstrong ............... 102/202.14 |
| 3,567,245 | 3/1971 | Ekstrom . |
| 3,723,205 | 3/1973 | Scheffe . |
| 3,741,580 | 6/1973 | Vos . |
| 3,743,318 | 2/1973 | Yamaguchi ................. 280/737 |
| 3,815,935 | 6/1974 | Jones . |
| 3,822,895 | 7/1974 | Ochiai . |
| 3,834,729 | 9/1974 | Oka et al. . |
| 3,868,124 | 2/1975 | Johnson . |
| 3,895,821 | 7/1975 | Schotthoefer et al. . |
| 4,033,610 | 7/1977 | Shingu et al. . |
| 4,084,839 | 4/1978 | Takagi et al. . |
| 4,312,271 | 1/1982 | Day et al. ............... 102/202.14 |
| 5,033,772 | 7/1991 | Frantom et al. . |

Primary Examiner—Karin L. Tyson
Attorney, Agent, or Firm—Tarolli, Sundheim & Covell

[57] ABSTRACT

An inflator assembly for inflating an inflatable vehicle occupant restraint includes a container defining a chamber with a rupturable wall. The chamber contains a first ignitable material and gas. The gas is directed from the container to the inflatable vehicle occupant restraint when the rupturable wall of the chamber is ruptured. The assembly further includes an initiator for rupturing the rupturable wall of the chamber and for igniting the first ignitable material inside the chamber. The initiator includes a second ignitable material. The second ignitable material produces a pressure wave and emits products of combustion when it is ignited by the initiator. The rupturable wall of the chamber is located in the path of the pressure wave and is ruptured by the pressure wave. The first ignitable material inside the chamber is located in the path of the products of combustion emitted by the second ignitable material and is ignited by the products of combustion.

24 Claims, 7 Drawing Sheets

HYBRID AIR BAG INFLATOR

BACKGROUND OF THE INVENTION

The present invention relates to an apparatus for inflating an inflatable device such as an inflatable vehicle occupant restraint.

BACKGROUND OF THE INVENTION

U.S. Pat. No. 3,723,205 discloses an inflator assembly for inflating an inflatable device such as an inflatable vehicle occupant restraint. The inflator assembly includes a container which contains a gas under pressure and a gas generated solid material. When the vehicle occupant restraint is to be inflated, a squib is actuated to ignite the gas generating solid material in the container. As the gas generating solid material is burned, the pressure in the container is increased by the gas and heat resulting from combustion of the gas generating solid material. When a predetermined pressure is reached, a rupture disk is ruptured to enable gas to flow from the container to the inflatable vehicle occupant restraint.

Another inflator assembly for inflating a vehicle occupant restraint is disclosed in co-pending U.S. patent application Ser. No. 763,180, filed Sep. 20, 1991, entitled "Inflator Assembly". The inflator assembly disclosed in the co-pending patent application also includes a container which contains a gas under pressure and a gas generating solid material. The container is closed by a rupture disk. The inflator assembly further includes an actuator assembly which is operable to rupture the disk to release a flow of gas from the container and to ignite the gas generating solid material in the container. The actuator assembly includes a piston and a pyrotechnic charge. The pyrotechnic charge, when ignited, generates pressure against the head of the piston to move the piston. The moving piston ruptures the rupture disk to release a flow of gas from the container. The ignited pyrotechnic charge also generates combustion products which are conducted to the gas generating solid material through a passage that extends through the piston. The combustion products ignite the gas generating solid material which then produces gas and heat that increase the pressure in the container. The pressurized gas flows from the container to the vehicle occupant restraint to inflate the vehicle occupant restraint.

SUMMARY OF THE INVENTION

The present invention is a new and improved inflator assembly for inflating an inflatable device such as an inflatable vehicle occupant restraint. The inflator assembly includes a container means defining a chamber with a rupturable wall. The chamber contains a first ignitable material and gas. The pressure of the gas in the chamber is increased when the first ignitable material is ignited and burned in the chamber. The first ignitable material is preferably a gas or a solid material, but can be any ignitable material.

The inflator assembly also includes a directing means and an initiator means. The directing means directs gas from the container means to the inflatable device when the rupturable wall of the chamber is ruptured. The initiator means ruptures the rupturable wall of the chamber and ignites the first ignitable material inside the chamber. The initiator means includes a second ignitable material. The second ignitable material, when ignited, produces a pressure wave and emits products of combustion. The rupturable wall of the chamber is located in the path of the pressure wave and is ruptured by the pressure wave. The first ignitable material inside the chamber is located in the path of the products of combustion emitted by the second ignitable material and is ignited by the products of combustion. Preferably, the second ignitable material in the initiator means is located outside the chamber.

An inflator assembly constructed in accordance with the invention inflates the inflatable device efficiently. The second ignitable material in the initiator means performs the function of rupturing the rupturable wall of the chamber in addition to the function of igniting the first ignitable material inside the chamber. The pressure wave produced by the second ignitable material moves directly against the rupturable wall of the chamber. Therefore, the inflator assembly does not need a mechanical device, such as a piston, to transmit the force of the pressure wave from the second ignitable material to the rupturable wall.

BRIEF DESCRIPTION OF THE DRAWINGS

The foregoing and other features of the present invention will become apparent to those skilled in the art to which the present invention relates from reading the following description of the invention with reference to the accompany drawings, in which.

DESCRIPTION OF PREFERRED EMBODIMENTS OF THE INVENTION FIRST EMBODIMENT

Figure 1:
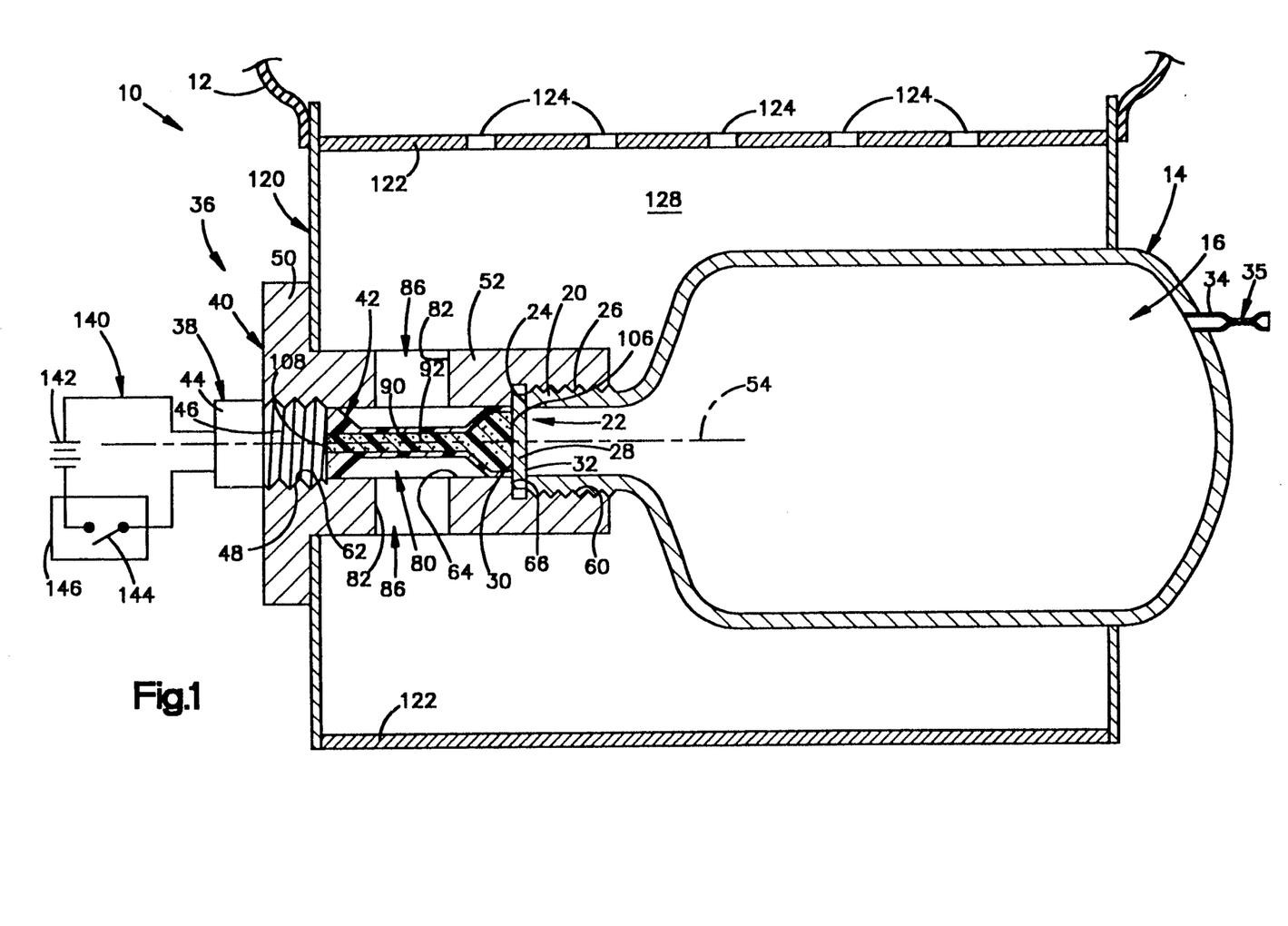
FIG. 1 is a schematic view of a vehicle occupant restraint apparatus constructed in accordance with a first embodiment of the present invention.

As shown schematically in FIG. 1, a first embodiment of the invention is an inflator assembly 10. The inflator assembly 10 inflates an inflatable vehicle occupant restraint 12, commonly referred to as an air bag. The vehicle occupant restraint 12 is inflated in response to vehicle deceleration indicative of a collision. The vehicle occupant restraint 12, when inflated, restrains movement of a vehicle occupant and protects the vehicle occupant from forcibly striking parts of the vehicle interior.

The inflator assembly 10 includes a metal container 14 having a sealed chamber 16. The chamber 16 contains a mixture of gases including an inert gas, a flammable fuel gas and an oxidizer gas. The inert gas is preferably nitrogen or argon or a mixture of nitrogen and argon. The fuel gas is preferably hydrogen or methane, or a mixture of hydrogen and methane, but can be any other flammable gas. The oxidizer gas is preferably oxygen. Alternatively, the inert gas can be eliminated and a combustible gas mixture that is very fuel-lean can be used. A small amount of an inert tracer gas such as helium can be added to assist in leak checking the chamber 16 in a known manner. The mixture of gases in the chamber 16 is preferably formulated in accordance with the invention set forth in co-pending U.S. patent application Ser. No. 761,685, filed Sep. 18, 1991, in the name of Jack L. Blumenthal, et al. and entitled "Apparatus for Inflating a Vehicle Occupant Restraint."

The container 14 has a neck portion 20 defining a circular opening 22 at one end of the chamber 16. The neck portion 20 of the container 14 has a circular rim 24 and a threaded cylindrical outer surface 26. The opening 22 is closed by a metal rupture disk 28. The rupture disk 28 has an outer surface 30 and an inner surface 32. The inner surface 32 of the rupture disk 28 is welded to the rim 24 of the neck portion 20 to seal the opening 22. The container 14 also has a fill tube 34 for filling the chamber 16. The fill tube 34 has a pinch 35 which is welded to close the fill tube 34.

The inflator assembly 10 also includes an initiating assembly 36 for initiating inflation of the vehicle occupant restraint 12. The initiating assembly 36 includes a squib 38, a diffuser cap 40, and an igniter member 42.

The squib 38 has a cylindrical head portion 44 and a smaller diameter cylindrical body portion 46. The cylindrical body portion 46 has a threaded outer surface 48. The squib 38 contains a pyrotechnic material, and emits products of combustion of the pyrotechnic material in a known manner when actuated.

The diffuser cap 40 has a cylindrical head portion 50 and a smaller diameter cylindrical body portion 52. The head portion 50 and the body portion 52 are both centered on the longitudinal axis 54 of the diffuser cap 40. The diffuser cap 40 also has three axially extending cylindrical inner surfaces 60, 62 and 64 that are centered on the longitudinal axis 54 and that define a central passage through the diffuser cap 40. An annular, radially extending inner surface 66 of the diffuser cap 40 is located axially between the first cylindrical inner surface 60 and the third cylindrical inner surface 64.

The first cylindrical inner surface 60 of the diffuser cap 40 is threaded and is receivable coaxially over the neck portion 20 of the container 14 in engagement with the threaded outer surface 26 of the neck portion 20. The diffuser cap 40 thus is mounted on the outside of the container 14 by screwing the body portion 52 of the diffuser cap 40 onto the neck portion 20 of the container 14. The body portion 52 is preferably screwed onto the neck portion 20 until the annular inner surface 66 of the diffuser cap 40 abuts the outer surface 30 of the rupture disk 28, as shown in FIG. 1.

The second cylindrical inner surface 62 of the diffuser cap 40 also is threaded. The squib 38 is screwed into the diffuser cap 40 with the threaded outer surface 48 of the squib 38 engaged with the threaded inner surface 62 of the diffuser cap 40.

The third cylindrical inner surface 64 of the diffuser cap 40 is a relatively smooth, unthreaded surface defining a gas flow passage 80 extending axially between the rupture disk 28 and the squib 38. The diffuser cap 40 also has four additional cylindrical inner surfaces 82, two of which are shown in FIG. 1. The additional cylindrical inner surfaces 82 extend radially outward from the third cylindrical inner surface 64 to the outer surface of the diffuser cap 40. Each of the additional cylindrical inner surfaces 82 defines one of a plurality of radial gas flow passages 86 communicating the axial gas flow passage 80 with the exterior of the diffuser cap 40.

Figure 2:
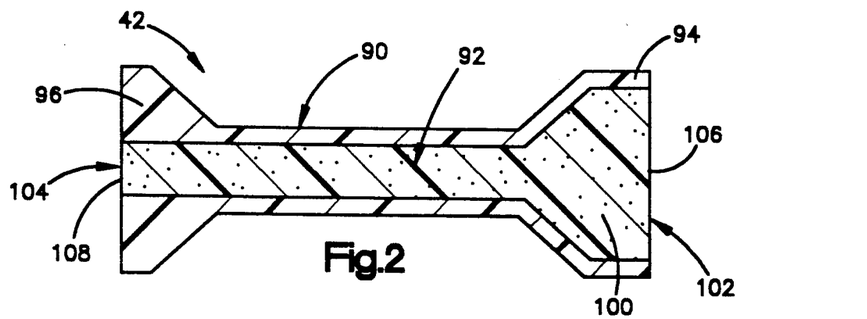
FIG. 2 is a sectional view of a part of the apparatus shown in FIG. 1.

As shown in FIG. 2, the igniter member 42 includes a casing 90 filled with an ignitable material 92. The casing 90 is an elongate plastic tube having a central, axially extending passage and enlarged opposite end portions 94 and 96. The central passage has a generally constant diameter throughout its length, but flares radially outward in the first end portion 94 of the casing 90. Because of the enlarged diameter of the central passage, the first end portion 94 of the casing 90 contains a major potion 100 of the ignitable material 92. The major portion 100 is a quantity of the ignitable material 92 which is greater than the quantity of the ignitable material 92 contained in the second end portion 96 of the casing 90. The first end portion 94 of the casing 90 also defines a circular opening 102 that is larger than the circular opening 104 defined by the second end portion 96. The major portion 100 of the ignitable material 92 thus has a circular surface 106 facing outward of the first end portion 94 which is larger than the circular surface 108 facing outward of the second end portion 96.

The ignitable material 92 in the casing 90 preferably is 80% pentaerythritol tetranitrate (PETN) and 20% of a silicone elastomer marketed by Dow Corning Corporation under the trademark SYLGARD 182. Metal particles, preferably formed of zirconium and/or titanium, are added to the ignitable material 92. The amount of the ignitable material 92 actually used is substantially less than that which is indicated by the proportionate size of the body of ignitable material 92 shown schematically in FIG. 1. The proportionate size of the body of ignitable material 92 is exaggerated relative to the container 14 for clarity of illustration. This also applies to the other embodiments of the invention illustrated schematically in the drawings.

As shown in FIG. 1, the igniter member 42 is located in the axial gas flow passage 80 in the diffuser cap 40. Each of the enlarged opposite end portions 94 and 96 of the casing 90 has a diameter approximately equal to the diameter of the axial gas flow passage 80 so that the igniter member 42 fits closely within the axial gas flow passage 80. The surface 106 of the ignitable material 92 at the first end portion 94 of the casing 90 preferably abuts the outer surface 30 of the rupture disk 28. The surface 108 of the ignitable material 92 at the second end portion 96 of the casing 90 preferably abuts the squib 38.

A diffuser assembly 120 is associated with the container 14 and the diffuser cap 40 to direct a flow of gas from the container 14 and the diffuser cap 40 to the inflatable vehicle occupant restraint 12. The diffuser assembly 120 includes a cylindrical diffuser wall 122 having a plurality of gas flow orifices 124. The cylindrical diffuser wall 122 defines a plenum 128 communicating the radial gas flow passages 86 in the diffuser cap 40 with the gas flow orifices 124.

The inflator assembly 10 is actuated upon completion of an electrical circuit 140. The electrical circuit 140 includes the squib 38 in the initiating assembly 36, and also includes a power source 142 and a switch 144. The power source 142 is preferably the vehicle battery and/or a capacitor. The switch 144 is preferably part of a vehicle deceleration sensor 146. The vehicle deceleration sensor 146 senses a predetermined rate of vehicle deceleration indicative of a collision and closes the switch 144 in response to the predetermined rate of vehicle deceleration. Such a vehicle deceleration sensor is known in the art.

When the vehicle experiences a collision, the vehicle deceleration sensor 146 senses the deceleration of the vehicle which is caused by the collision and closes the switch 144. Electric current then flows from the power source 142 through the squib 38 to ignite the pyrotechnic material in the squib 38. The products of combustion of the pyrotechnic material are emitted from the squib 38 and contact the surface 108 of the ignitable material 92 in the igniter member 42. The ignitable material 92 is then ignited. The ignitable material 92 produces a pressure wave and emits products of combustion when it is ignited.

The pressure wave produced by the ignitable material 92 moves from the ignitable material 92 in radial and axial directions. The rupture disk 28 closing the chamber 16 in the container 14 is thus located in the path of the pressure wave. The pressure wave moves directly against the rupture disk 28 to rupture the rupture disk 28 and thereby to release the mixture of gases to flow out of the chamber 16 through the opening 22. Specifically, the central potion of the rupture disk 28, which is located radially within the opening 22, is sheared away from the peripheral portion of the rupture disk 28, which is welded to the rim 24. The central portion of the rupture disk 28 is moved into the chamber 16 by the pressure wave and does not block the gas flowing from the chamber 16 through the opening 22. The central portion of the rupture disk 28 is moved away from the opening 22 by the pressure wave in one microsecond or less. Alternatively, the rupture disk 28 could be provided with score marks that define weakened portions of the rupture disk 28. The weakened portions of the rupture disk 28 would break under the force of the pressure wave to release the mixture of gases to flow out of the chamber 16.

The pressure wave produced by the ignitable material 92 also shatters the casing 90. The pressure wave thereby clears a path for the gas to flow from the opening 22 through the axial gas flow passage 80 and into the plenum 128 through the radial gas flow passages 86. The flow of gas continues from the plenum 128 into the vehicle occupant restraint 12 through the gas flow orifices 124.

The products of combustion emitted by the ignitable material 92 include flame, vapors and hot particles. The hot particles include the metal particles which are added to the ignitable material 92 and which are heated when the ignitable material 92 is ignited. Some of the products of combustion are propelled into the mixture of gases in the chamber 16, and some of the products of combustion encounter the mixture of gases moving from the opening 22 through the diffuser cap 40. The flammable fuel gas in the mixture of gases is ignited by the products of combustion of the ignitable material 92. The flammable fuel gas is then burned in the presence of oxygen, and the temperature and pressure of the mixture of gases increase as a result of the combustion of the flammable fuel gas. The pressure of the gas directed from the container 14 to the inflatable vehicle occupant restraint 12 is increased sufficiently to enable the gas stored in the chamber 16 to inflate the vehicle occupant restraint 12 fully.

Second Embodiment

Figure 3:
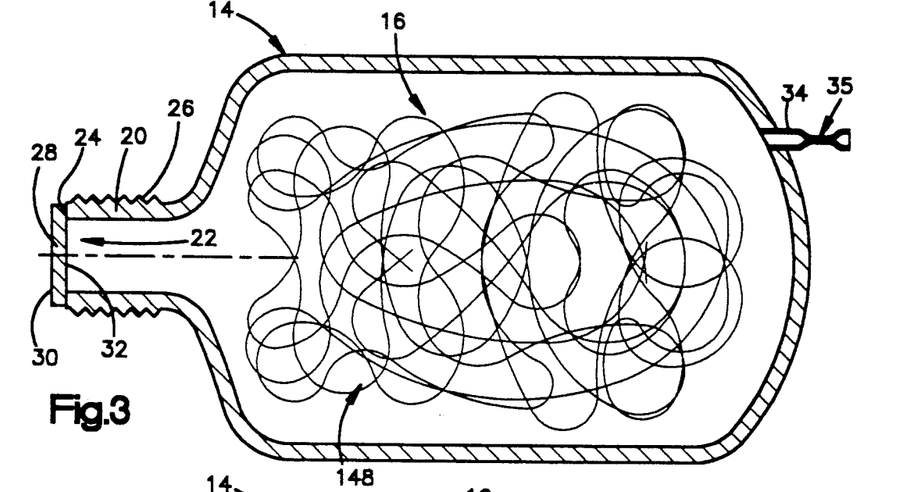
FIG. 3 illustrates a second embodiment of the present invention.

A second embodiment of the invention is illustrated in FIG. 3. In the second embodiment of the invention, the sealed chamber 16 in the container 14 does not contain the mixture of gases described above, which includes an inert gas, a flammable fuel gas and an oxidizer gas. Instead, the chamber 16 contains a combustible metallic wire 148 and a gas, including oxygen. The combustible metallic wire 148 is preferably formed of zirconium and preferably extends substantially throughout the entire volume of gas in the chamber 16. The composition and quantity of the combustible metallic wire 148, and of the gas in the chamber 16, are most preferably selected in accordance with the invention set forth in the co-pending U.S. Pat. application filed in the names of Jack L. Blumenthal and Peter Staudhammer, entitled "Apparatus for Inflating a Vehicle Occupant Restraint."

The combustible metallic wire 148 shown in FIG. 3 performs the function of the flammable fuel gas described above with reference to FIG. 1. The combustible metallic wire 148 is similarly ignited by the products of combustion of the ignitable material 92. The pressure of the gas directed from the container 14 to the inflatable vehicle occupant restraint 12 is increased as a result of the combustion of the combustible metallic wire 148. Alternatively, the chamber 16 could contain both the combustible metallic wire 148 and the mixture of gases including the flammable fuel gas. The combustible metallic wire 148 would then serve as a supplement to the flammable fuel gas in the mixture of gases.

Third Embodiment

Figure 4:
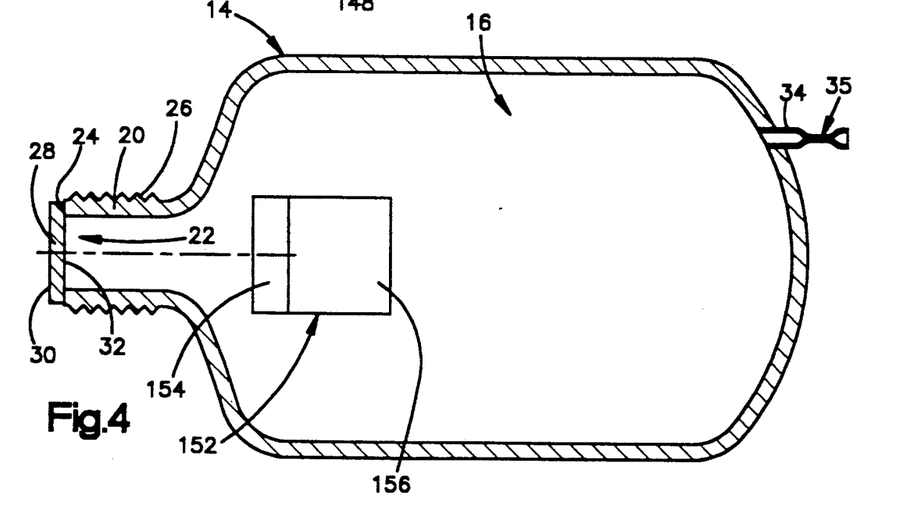
FIG. 4 illustrates a third embodiment of the present invention.

A third embodiment of the invention is illustrated in FIG. 4. In the third embodiment of the invention, the chamber 16 in the container 14 contains a gas generating solid material 152 and a gas. The gas generating solid material 152 is ignited by the products of combustion emitted from the ignitable material 92 (FIG. 1). When the gas generating solid material 152 is ignited and burned, it produces a large volume of gas. The large volume of gas produced by combustion of the gas generating solid material 152 augments the gas which is stored in the container 16 so that a sufficient flow of gas can be directed from the container 14 into the vehicle occupant restraint 12 to inflate the vehicle occupant restraint 12 fully.

The gas generating solid material 152 preferably comprises a booster charge 154 and a body of gas generating pyrotechnic material 156, as shown schematically in FIG. 4. The booster charge 154 is directly ignited by the products of combustion emitted from the ignitable material 92. When the booster charge 154 is burned, the body of gas generating pyrotechnic material 156 is ignited by the products of combustion emitted from the booster charge 154. The booster charge 154 is preferably formed of boron potassium nitrate (BKNO$_3$). The gas generating pyrotechnic material 156 can have the following composition:

| Ingredient | Weight % |
|---|---|
| Potassium perchlorate | 73% |
| Dioctyl adipate | 8.7% |
| Polyvinyl chloride | 6.6% |
| Carbon black | 0.05% |
| Stabilizers (boron, chromium) | 0.15% |
| Potassium nitrate | 11.5% |

Alternatively, the body of gas generating pyrotechnic material 156 can have the following formulation, which is identified by the Universal Propulsion Company, Inc., a Talley Industries Company, as X167-31 (UPCo 6002):

| Ingredient | Weight % |
| --- | --- |
| Geon 121 AR (polyvinyl chloride resin) | 5.594 |
| Dioctyl adipate | 8.390 |
| Thermcheck 120 (a stabilizer) | 0.149 |
| Thermcheck SV100 (a mixture of aliphatic solvents, barium salts, aromatic hydrocarbons, and zinc salts) | 0.075 |
| Sodium carbonate | 4.742 |
| Iron oxide | 0.050 |
| Potassium Perchlorate, 200 | 52.650 |
| Potassium Perchlorate, 20 | 28.350 |

Fourth Embodiment

A fourth embodiment of the invention is illustrated in FIGS. 5A-5D. In the fourth embodiment of the invention, an alternative igniter member 150 is substituted for the igniter member 42 shown in FIGS. 1 and 2.

Figure 5A:
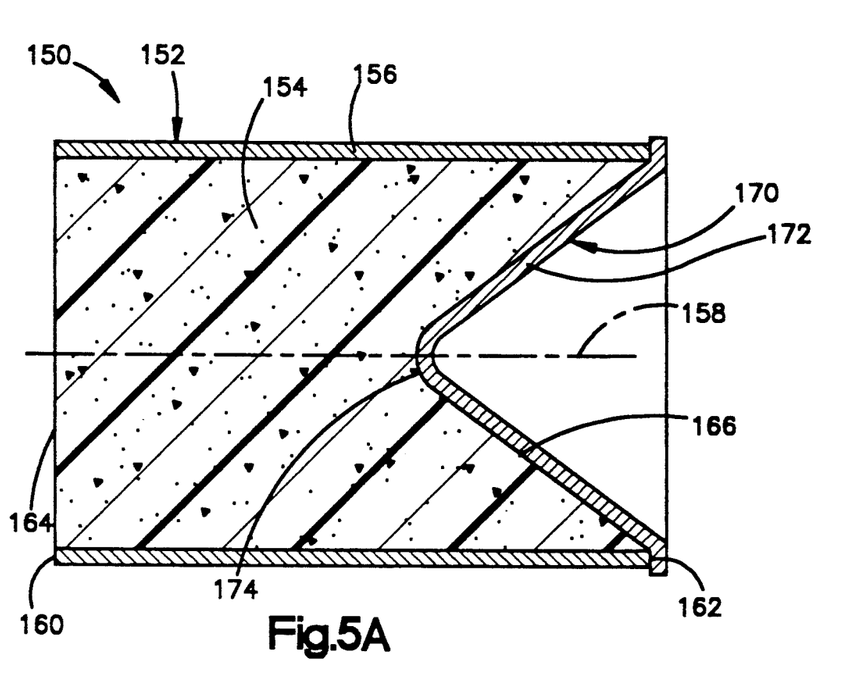
FIGS. 5A through 5D are sectional views illustrating a fourth embodiment of the present invention.

The igniter member 150 includes a casing 152 containing an ignitable material 154. The casing 152 has a cylindrical side wall 156 centered on an axis 158. The side wall 156 of the casing 152 is preferably formed of metal, but can be formed of plastic. The side wall 156 has a first open end 160 and a second open end 162. An exposed surface 164 of the ignitable material 154 faces outward of the first open end 160 of the side wall 156. A covered surface 166 of the ignitable material 154 faces outward of the second open end 162 of the side wall 156. The covered surface 166 of the ignitable material 154 has a conical shape centered on the axis 158. The ignitable material 154 is thus formed as a shaped charge. When the ignitable material 154 is ignited at the exposed surface 164, the conical shape of the covered surface 166 causes a pressure wave to collapse the covered surface 166 on the axis 158 and to concentrate and direct products of combustion from the ignitable material 154 along the axis 158.

The igniter member 150 further includes a liner 170 closing the second open end 162 of the side wall 156. The liner 170 has a conical shape with a side portion 172 that extends radially and axially inward from the second open end 162 of the side wall 156, and a base portion 174 that lies on the axis 158. The liner 170 is preferably formed of metal, but could be formed of plastic. The liner 170 extends over the covered surface 166 of the ignitable material 154 in abutting contact with the covered surface 166.

The igniter member 150 shown in FIG. 5A is receivable in the initiating assembly 36 in place of the igniter member 42 described above with reference to FIGS. 1 and 2. Like the igniter member 42, the igniter member 150 is coaxially receivable in the axial gas flow passage 80 in the diffuser cap 40. When the initiating assembly 36 initiates inflation of the vehicle occupant restraint 12, the ignitable material 154 is ignited at its exposed surface 164 by the squib 38. The ignitable material 154 then produces a pressure wave 180, as indicated in FIGS. 5B-5D.

Figure 5B:
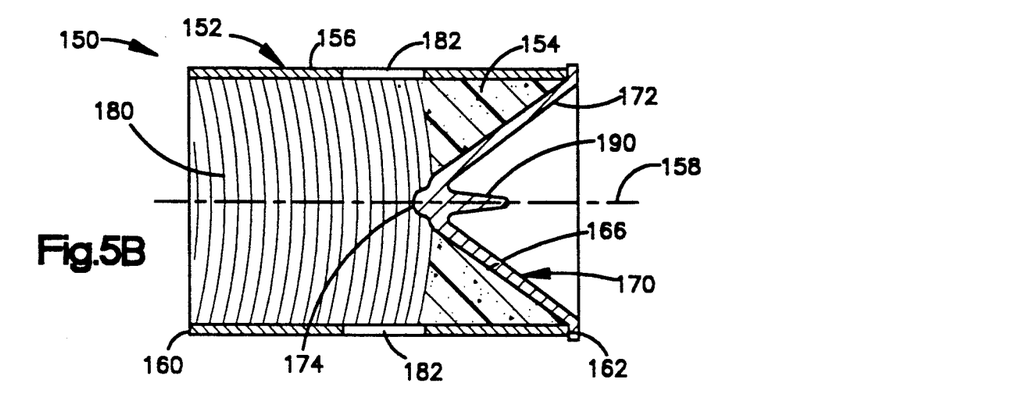
Figure 5C:
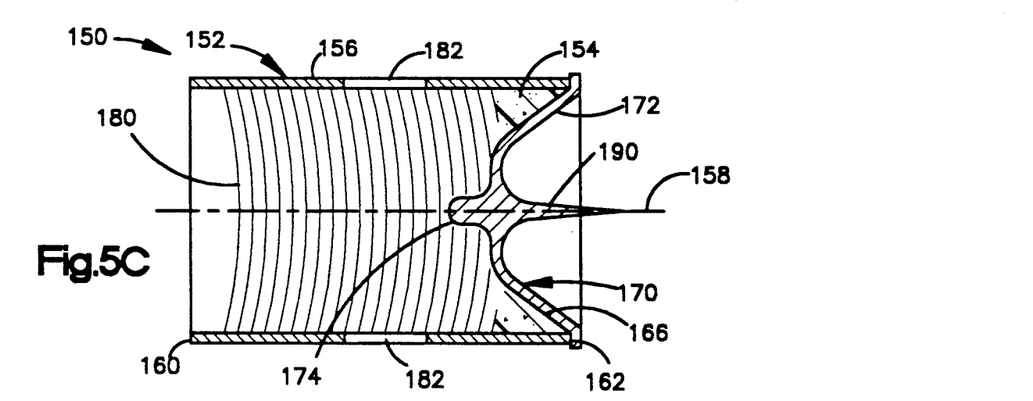
Figure 5D:
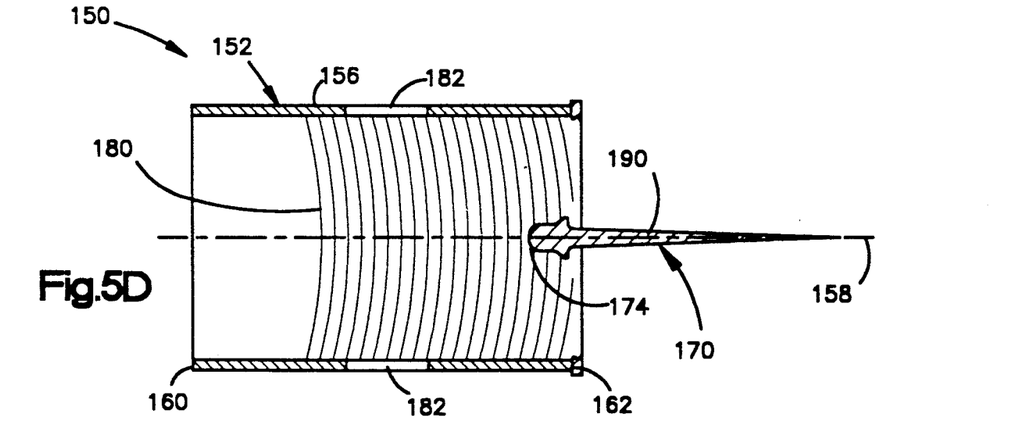

As indicated in FIG. 5B, the pressure wave 180 produced by the ignitable material 154 moves against the side wall 156 of the casing 152. When the pressure wave 180 reaches the portions of the side wall 156 which are located adjacent to the radial gas flow passages 86 in the diffuser cap 40 (FIG. 1), those portions of the side wall 156 are ruptured by the pressure wave 180 to define gas outlet openings 182 in the side wall 156.

When the pressure wave 180 reaches the base portion 174 of the liner 170, as indicated in FIG. 5B, the liner 170 begins to be deformed from its original conical shape by the pressure wave 180. The liner 170 also begins to soften and deform from the heat which is generated by the ignitable material 154. Some of the material of the liner 170 in and around the base portion 174 is thus formed into a substantially fluidized portion 190 of the liner 170.

The ignitable material 154 is formed as a shaped charge, as described above. When the force of the pressure wave 180 is directed against the liner 170, the liner 170 is collapsed on itself along the axis 158. The force of the pressure wave 180 first acts upon the base portion 174 of the liner 170, and then acts progressively upon the side portion 172 of the liner 170. The force of the pressure wave 180 thus collapses the liner 170 onto the axis 158 progressively from the left to the right as shown in FIGS. 5B and 5C. The base portion 174 of the liner 170 is thus urged to move axially out of the casing 152 before the side portion 172 is urged to move axially out of the casing 152. The fluidized portion 190 of the liner 170 is therefore propelled along the axis 158 past the side portion 172.

The base portion 174 of the liner 170 also is fluidized and becomes progressively more massive as the material of the liner 170 is deformed from the condition shown in FIG. 5B to the condition shown in FIG. 5C. As the base portion 174 becomes more massive, the fluidized portion 190, which has less mass than the base portion 174, is moved along the axis 158 with a velocity that is greater than the velocity of the base potion 174. The fluidized portion 190 is thus propelled outward of the casing 152 in the form of a jet. The pressure wave 180 eventually forces substantially all of the material of the liner 170 into the base portion 174 and the fluidized portion 190. The material of the liner 170 then emerges from the casing 152 in the form of a jet, as shown in FIG. 5D.

When the material of the liner 170 emerges from the casing 152 in the form of a jet as shown in FIG. 5D, the jet is moving along the axis 158 forcefully enough to penetrate the rupture disk 28 which closes the container 14 shown in FIG. 1. The mixture of gases in the chamber 16 is then released to flow out of the chamber 16 through a hole in the rupture disk 28 which is formed by the jet. The jet also weakens the rupture disk 28 to assist the pressure wave 180 in fully rupturing the rupture disk 28. The jet, which is heated, encounters and ignites the ignitable material contained in the chamber 16. The ignitable material contained in the chamber 16 can be a flammable fuel gas, a combustible metallic wire or a gas generating solid material.

Fifth Embodiment

Figure 6:
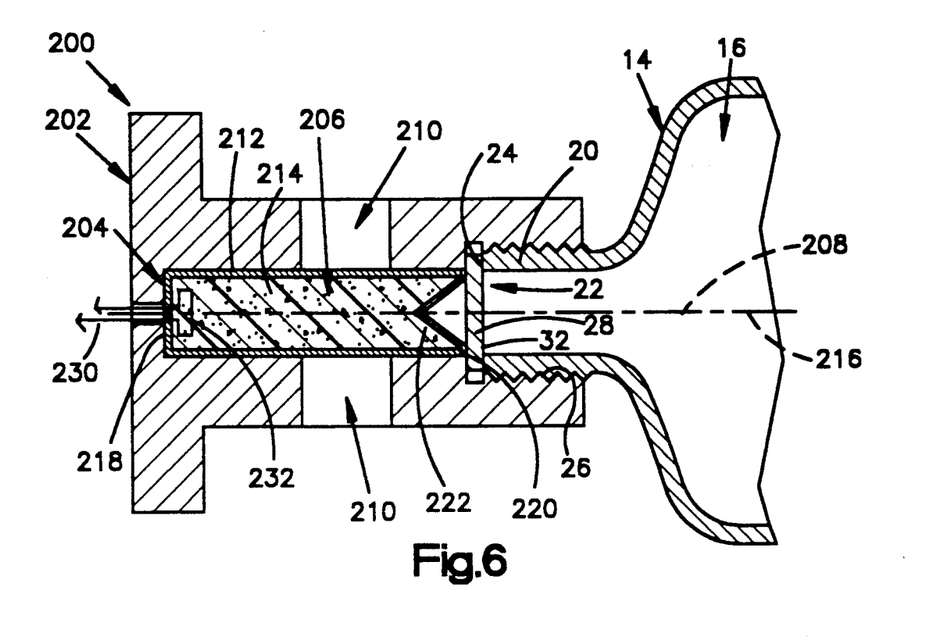
FIG. 6 illustrates a fifth embodiment of the present invention.

A fifth embodiment of the invention is illustrated in FIG. 6. In the fifth embodiment of the invention, an alternative initiating assembly 200 is substituted for the initiating assembly 36 shown in FIG. 1.

The initiating assembly 200 includes a diffuser cap 202 and an igniter member 204. The diffuser cap 202 has an axial gas flow passage 206 centered on an axis 208. A plurality of radial gas flow passages 210 in the diffuser cap 202 communicate the axial gas flow passage 206 with the exterior of the diffuser cap 202.

Figure 6A:
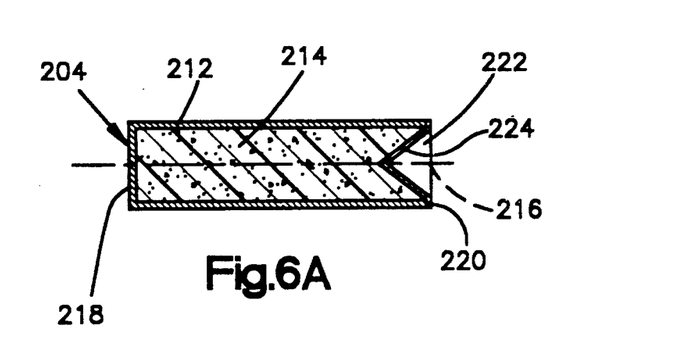
FIG. 6A is a sectional view of a part of the apparatus illustrated in FIG. 6.

As shown in FIG. 6A, the igniter member 204 includes a cylindrical metal casing 212 containing an ignitable material 214. The casing 212 has a longitudinal axis 216, an end wall 218 and an open end 220. A metal liner 222 closes the open end 220 of the casing 212. The liner 222 has a conical shape centered on the axis 216. The liner 222 covers a conical surface 224 of the ignitable material 214 in abutting contact with the conical surface 224. The ignitable material 214 and the liner 222 are thus arranged like the ignitable material 154 and the liner 170 described above with reference to FIG. 5A. The igniter member 204 shown in FIG. 6A is thus constructed to direct a jet outward from the casing 212 along the axis 216 when the ignitable material 214 is ignited.

As shown in FIG. 6, the igniter member 204 is received coaxially in the axial gas flow passage 206 in the diffuser cap 202. The liner 222 is located adjacent to the rupture disk 28 on the container 14. An electrical line 230 extending through the end wall 218 of the casing 212 has an uninsulated portion 232 extending within the ignitable material 214. The electrical line 230 is part of an electrical circuit that functions like the electrical circuit 140 described above with reference to FIG. 1. When the electrical circuit including the electrical line 23 responds to a predetermined rate of vehicle deceleration indicative of a collision, electric current flows through the uninsulated portion 232 of the electrical line 230. The uninsulated potion 232 of the electrical line 230 is then resistively heated and ignites the ignitable material 214.

The ignitable material 214 produces a pressure wave when it is ignited. The pressure wave ruptures the portions of the casing 212 which are located adjacent to the radial gas flow passages 210 in the diffuser cap 202. The liner 222 is optional. If the liner 222 is used, a jet is formed by the liner 222 in the manner described above with reference to the liner 170 shown in FIGS. 5A–5D. The jet is propelled along the axes 208 and 216 and penetrates the rupture disk 28 on the container 14. The penetrated rupture disk 28 is fully ruptured and moved away from the opening 22 by the pressure wave. The mixture of gases in the chamber 16 is thus released to flow out through the opening 22 and through the diffuser cap 202 toward the inflatable device. Additionally, the jet and/or other products of combustion of the ignitable material 214 ignite the ignitable material contained in the chamber 16. The ignitable material contained in the chamber 16 can be a flammable fuel gas, a combustible metallic wire or a gas generating solid material.

Sixth Embodiment

Figure 7:
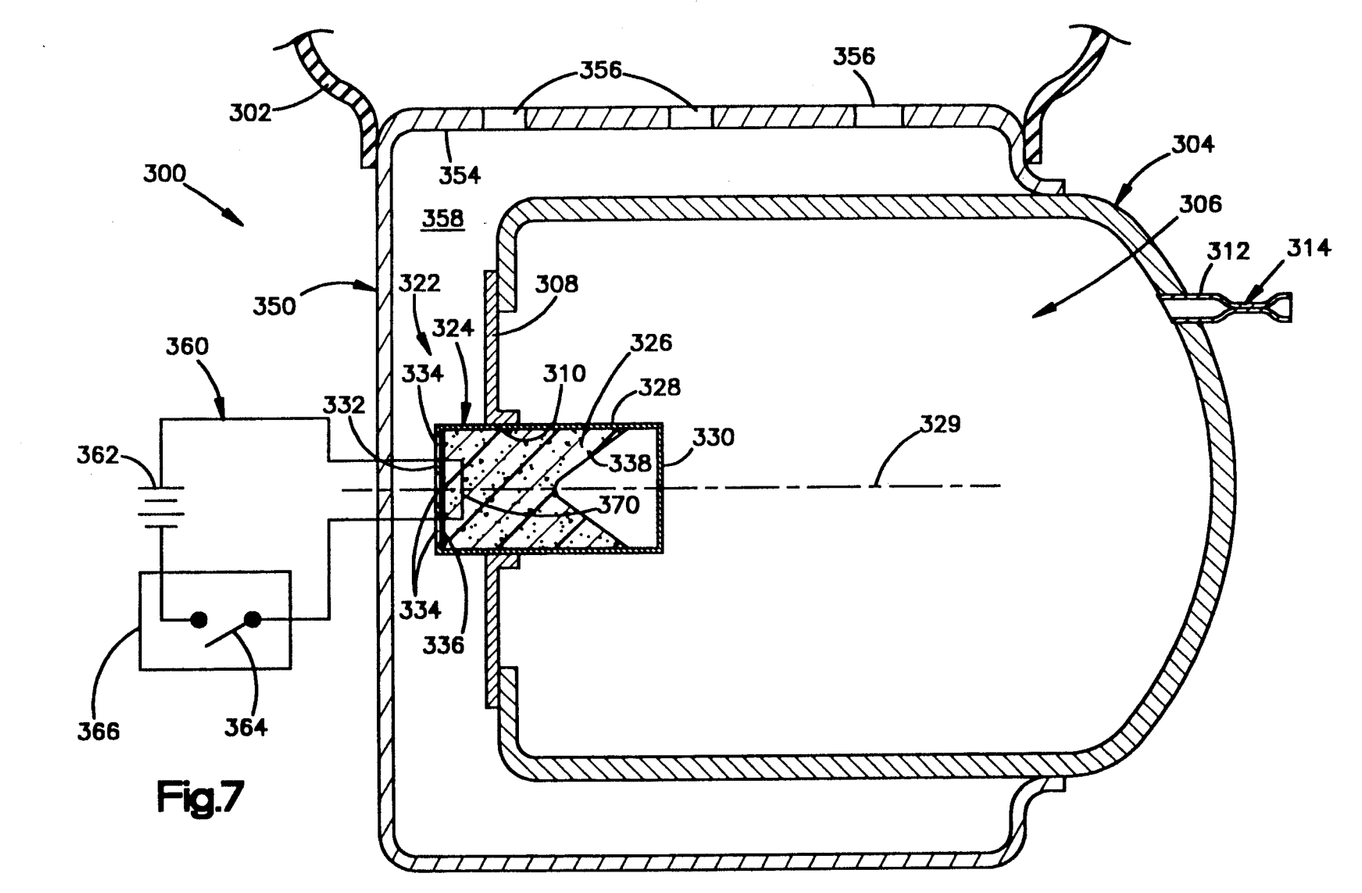
FIG. 7 is a schematic view of a vehicle occupant restraint apparatus constructed in accordance with a sixth embodiment of the present invention.

As shown schematically in FIG. 7, a sixth embodiment of the present invention is an inflator assembly 300. The inflator assembly 300 inflates an inflatable vehicle occupant restraint 302. The vehicle occupant restraint 302 is inflated in response to vehicle deceleration indicative of a collision. The vehicle occupant restraint 302, when inflated, restrains movement of a vehicle occupant and protects the vehicle occupant from forcibly striking parts of the vehicle interior.

The inflator assembly 300 includes a metal container 304 having a sealed chamber 306. The chamber 306 contains a mixture of gases including an inert gas, a flammable fuel gas and an oxidizer gas. The mixture of gases contained in the chamber 306 is preferably formulated as in the first embodiment of the invention described above with reference to FIG. 1.

The container 304 has an end wall 308 with an annular surface 310 defining a circular opening through the center of the end wall 308. The container 304 also has a fill tube 312 for filling the chamber 306. The fill tube 312 has a pinch 314 which is welded to close the fill tube 312.

The inflator assembly 300 also includes an initiator 322 for initiating inflation of the vehicle occupant restraint 302. The initiator 322 includes a metal housing 324 containing a propellant material 326. The housing 324 has a cylindrical side wall 328 with a central axis 329, a first end wall 330, and a second end wall 332. The cylindrical side wall 328 of the housing 324 is closely received within the opening defined by the surface 310 on the end wall 308 of the container 304. The opening is sealed to prevent the gases in the chamber 306 from leaking past the cylindrical side wall 328 of the housing 324.

The first end wall 330 of the housing 324 closes the first end of the cylindrical side wall 328 and prevents the gases in the chamber 306 from flowing into the housing 324. The first end wall 330 of the housing 324 is rupturable, and thus serves as a rupturable wall of the chamber 306.

The second end wall 332 of the housing 324 has a plurality of gas flow openings 334. A burst foil sheet 336 is located in the housing 324 between the propellant material 326 and the gas flow openings 334 to provide a hermetic seal which prevents moisture from reaching the propellant material 326. Preferably, the burst foil sheet 336 is adhered to the inside surface of the second end wall 332, as shown in FIG. 7.

The propellant material 326 has a conical surface 338. The conical surface 338 is centered on the axis 329 and faces the first end wall 330 of the housing 324. The propellant material 326 is thus formed as a shaped charge to concentrate and direct a jet of combustion products along the axis 329 when the propellant material 326 is ignited. Unlike the conical surface 166 described above with reference to FIG. 5A, the conical surface 338 is not covered by a liner.

The propellant material 326 can have many different compositions. One example of a composition of the propellant material 326 is as follows:

| Ingredient | % By Weight |
| --- | --- |
| Boron potassium nitrate (BKNO$_3$) | 72% |
| Titanium hydride | 14% |
| Potassium perchlorate | 14% |

Metal particles, preferably formed of zirconium and/or titanium, are added to the propellant material 326.

The inflator assembly 300 further includes a diffuser assembly 350 for directing a flow of gas from the container 304 to the inflatable vehicle occupant restraint 302. The diffuser assembly 350 includes a cylindrical diffuser wall 354 having a plurality of gas flow orifices 356. The cylindrical diffuser wall 354 defines a plenum 358 communicating the gas flow openings 334 in the initiator housing 324 with the gas flow orifices 356 in the diffuser wall 354. The gas flow orifices 356 communicate the plenum 358 with the vehicle occupant restraint 302.

An electrical circuit 360 includes the initiator 322, a power source 362 and a switch 364. The power source 362 is preferably the vehicle battery and/or a capacitor. The switch 364 is preferably part of a vehicle deceleration sensor 366. The vehicle deceleration sensor 366 senses a predetermined rate of vehicle deceleration indicative of a collision and closes the switch 364 in response to the predetermined rate of vehicle deceleration. As noted above, such a vehicle deceleration sensor is known in the art.

When the vehicle experiences a collision, the vehicle deceleration sensor 366 senses the deceleration of the vehicle which is caused by the collision and closes the switch 364. Electric current then flows through the electrical circuit 360 to actuate the initiator 322. The electric current flows along an uninsulated portion 370 of a wire extending within the propellant material 326. The uninsulated portion 370 of the wire is then resistively heated and ignites the propellant material 326. Alternatively, any ignition system known in the art and suitable for igniting the propellant material 326 could be used.

The ignited propellant material 326 emits products of combustion including flame, vapors and hot particles. The hot particles include the metal particles which are added to the propellant material 326 and which are heated when the propellant material 326 is ignited. The ignited propellant material 326 also generates a pressure wave. The conical shape of the surface 338 causes the pressure wave to concentrate and direct the products of combustion along the axis 329 in the form of jet. The jet of combustion products penetrates and then ruptures the first end wall 330 of the housing 324 and moves into the chamber 306. The pressure wave further opens the first end wall 330. The mixture of gases in the chamber 306 is thus released to flow into the housing 324.

The ignited propellant material 326 also directs a pressure wave against the burst foil sheet 336 at the second end wall 332 of the housing 324. The burst foil sheet 336 bursts under the force of the pressure wave. The gas flow openings 334 then communicate with the interior of the housing 324. The ignited propellant material 326 is consumed rapidly by combustion and clears the way for the gases in the chamber 306 to flow through the housing 324 and into the plenum 358. The gases in the chamber 306 then flow through the housing 324 and the plenum 358 to the vehicle occupant restraint 302 to inflate the vehicle occupant restraint 302. Alternatively, the second end wall 332 of the housing 324 could be replaced with a plastic end fitting which closes the second end of the housing 324 and which blows out to open the second end of the housing 324 to allow a flow of gas through the housing 324.

As described above, some of the products of combustion of the ignited propellant material 326 are propelled through the first end wall 330 and into the mixture of gases in the chamber 306 in the form of a jet. Additionally, some of the products of combustion encounter the mixture of gases moving through the initiator housing 324. The flammable fuel gas in the mixture of gases is ignited by the products of combustion. The flammable fuel gas is then burned in the presence of oxygen, and the temperature and pressure of the mixture of gases increase as a result of the combustion of the flammable fuel gas. The pressure of the gas directed from the container 304 to the inflatable vehicle occupant restraint 302 is increased sufficiently to enable the gas stored in the chamber 306 to inflate the vehicle occupant restraint 302 fully.

In a variation of the sixth embodiment of the invention, the surface 338 of the propellant material 326 could have a shape which differs form the axially centered conical shape shown in FIG. 7. The shape of the surface 338 could be adapted in a known manner to yield a "defocused" jet of combustion products which is not fully concentrated on the axis 329. Such a defocused jet would impact a relatively large surface area of the first end wall 330 of the housing 324. The defocused jet would therefore rupture the first end wall 330 more fully than a jet that is focused to puncture the first end wall 330 on the axis 329.

In another variation of the sixth embodiment of the invention, the chamber 306 shown in FIG. 7 could contain a combustible metallic wire such as the combustible metallic wire 148 described above with reference to FIG. 3. Such a combustible metallic wire located in the chamber 306 would serve as either a substitute or a supplement for the flammable fuel gas in the mixture of gases contained in the chamber 306.

In yet another variation of the sixth embodiment of the invention, the chamber 306 shown in FIG. 7 could contain a gas generating solid material such as the gas generating solid material 152 described above with reference to FIG. 4. Such a gas generating solid material contained in the chamber 306 would produce heat and a volume of gas when it is ignited and burned by the products of combustion that are emitted from the propellant material 326 in the initiator housing 324. The heat and gas produced by combustion of the gas generating solid material would increase the pressure of and augment the gas which is stored in the container 306. A sufficient flow of gas would be directed from the container 304 into the vehicle occupant restraint 302 to inflate the vehicle occupant restraint 302 fully.

Seventh Embodiment

Figure 8:
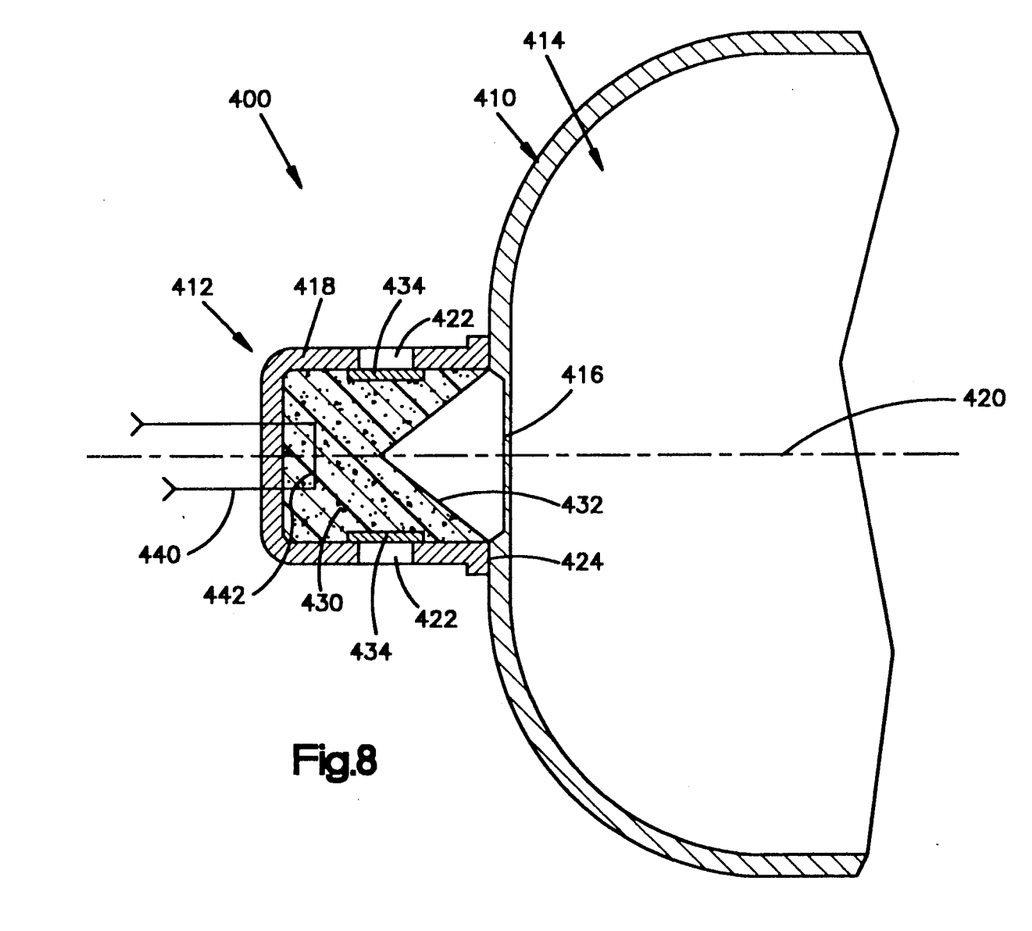
FIG. 8 illustrates a seventh embodiment of the present invention.

As shown partially in FIG. 8, a seventh embodiment of the present invention is an inflator assembly 400 for inflating an inflatable device such as an inflatable vehicle occupant restraint. The parts of the inflator assembly 400 shown in FIG. 8 include a metal container 410 and an initiator assembly 412.

The container 410 has a sealed chamber 414 and a thinned wall portion 416. The chamber 414 contains a mixture of gases which is preferably formulated as in the first embodiment of the invention described above with reference to FIG. 1. The thinned wall portion 416 of the container 410 is a rupturable wall portion of the container 410.

The initiator assembly 412 includes a cup-shaped metal housing 418 which is welded to the container 410. The housing 418 has a central axis 420, a plurality of gas flow openings 422 and an open end 424. The open end 424 of the housing 418 is received over and surrounds the thinned wall portion 416 of the container 410.

The initiator assembly 412 also includes a propellant material 430 contained in the housing 418. The propellant material 430 preferably has the same composition as the propellant material 326 described above with reference to FIG. 7. Metal particles, preferably formed of zirconium and/or titanium, are added to the propellant material 430.

As shown in FIG. 8, the propellant material 430 has a conical surface 432 which is centered on the axis 420 and which faces the thinned wall portion 416 of the container 410. The propellant material 430 is thus formed as a shaped charge to concentrate and direct a jet of combustion products along the axis 420 toward the thinned wall portion 416 when the propellant material 430 is ignited. One or more pieces of burst foil material 434 are located between the propellant material 430 and the gas flow openings 422 to provide a hermetic seal protecting the propellant material 430 from moisture.

The inflator assembly 400 also includes an electrical line 440 which is part of an electrical circuit that functions like the electrical circuits 140 and 360 described above with reference to FIGS. 1 and 7. The electrical line 440 has an uninsulated portion 442 extending within the propellant material 430 in the housing 418. When the electrical circuit including the electrical line 440 responds to a predetermined rate of vehicle deceleration indicative of a collision, electric current flows along the electrical line 440 and resistively heats the uninsulated portion 442. The uninsulated portion 442 of the electrical line 440 then ignites the propellant material 430.

When the propellant material 430 is ignited, it emits products of combustion including flame, vapors and hot particles. The hot particles include the metal particles which are added to the propellant material 430 and which are heated when the propellant material 430 is ignited. The ignited propellant material 430 also generates a pressure wave. The conical shape of the surface 432 causes the pressure wave to concentrate and direct the products of combustion along the axis 420 in the form of jet. The jet of combustion products penetrates the thinned wall portion 416 of the container 410 and moves into the chamber 414. The pressure wave further ruptures the thinned wall portion 416. The mixture of gases in the chamber 414 is thus released to flow into the housing 418.

The ignited propellant material 430 also directs a pressure wave against the burst foil material 434 at the gas flow openings 422 of the housing 418. The burst foil material 434 bursts under the force of the pressure wave. The gas flow openings 422 then communicate with the interior of the housing 418. The ignited propellant material 430 is consumed rapidly by combustion and clears the way for the gases in the chamber 414 to flow through the housing 418 and outward from the gas flow openings 422 toward the inflatable device.

Some of the products of combustion of the ignited propellant material 430 are propelled through the thinned wall portion 416 of the container 410 and into mixture of gases in the chamber 414 in the form of a jet. Additionally, some of the products of combustion encounter the mixture of gases moving through the housing 418. The flammable fuel gas in the mixture of gases is ignited by the products of combustion of the propellant material 430. The flammable fuel gas is then burned in the presence of oxygen, and the temperature and pressure of the mixture of gases increase as a result of the combustion of the flammable fuel gas. The pressure of the gas directed from the container 410 to the inflatable device is increased sufficiently to enable the gas stored in the chamber 414 to inflate the device fully. As with the embodiments of the invention described above, the chamber 414 in the seventh embodiment of the invention could contain a flammable fuel gas, a combustible metallic wire, and/or a gas generating solid material.

From the above description of the invention, those skilled in the art will perceive improvements, changes and modifications. For example, any initiator capable of rupturing the rupturable wall of the container and emitting products of combustion to ignite the ignitable material in the container can be used in the present invention. Further, although the initiators of the foregoing embodiments are described as producing or emitting hot particles and other products of combustion to ignite the ignitable material, such particles could be produced as the result of rupturing the container wall. The hot particles would thus be heated particles of the wall material. Additionally, the pressure wave could ignite the ignitable material contained in the chamber upon impact with the ignitable material in the chamber. Such improvements, changes and modifications within the skill of the art are intended to be covered by the appended claims.

We claim:

1. An apparatus for inflating an inflatable device, said apparatus comprising:

container means for defining a sealed chamber, said chamber containing gas, said container means including a rupturable container wall which is rupturable to define a gas exit opening through which said gas flows outward from said chamber;

said chamber further containing a first ignitable means for increasing the temperature and pressure of said gas in said chamber by producing products of combustion which increase the temperature and pressure of said gas in said chamber, said first ignitable means including a first ignitable material which is contained in said chamber with said gas and which, when ignited, produces said products of combustion;

directing means for directing said gas flowing outward from said chamber through said gas exit opening into the inflatable device when said rupturable container wall is ruptured; and initiator means for first rupturing said rupturable container wall and for then igniting said first ignitable material in said chamber after rupturing said rupturable container wall, said initiator means including a second ignitable material which, when ignited, produces a pressure wave and emits products of combustion;

said pressure wave moving against said rupturable container wall and rupturing said rupturable container wall, said products of combustion of said second ignitable material moving into contact with said first ignitable material in said chamber and igniting said first ignitable material in said chamber.

2. An apparatus as defined in claim 1 wherein said second ignitable material is located outside said chamber and propels said products of combustion of said second ignitable material into said chamber through said gas exit opening.

3. An apparatus as defined in claim 2 wherein said first ignitable material in said chamber comprises a flammable fuel gas mixed with said gas in said chamber, and wherein said apparatus further comprises an oxidizer in said chamber.

4. An apparatus as defined in claim 2 wherein said first ignitable material in said chamber comprises a combustible metallic wire, and wherein said apparatus further comprises an oxidizer in said chamber.

5. An apparatus as defined in claim 2 wherein said first ignitable material in said chamber comprises a gas generating solid material.

6. An apparatus as defined in claim 2 wherein said second ignitable material is formed as a shaped charge having a surface means for causing said pressure wave to concentrate and direct said products of combustion of said second ignitable material along an axis, said initiator means further comprising a liner means received over said surface means, said liner means being deformed by said pressure wave into the form of a jet and being propelled by said pressure wave along said axis to penetrate said rupturable container wall.

7. An apparatus as defined in claim 1 wherein said second ignitable material is formed as a shaped charge having a surface means for causing said pressure wave to concentrate and propel said products of combustion along an axis in the form of a jet which penetrates said rupturable container wall.

8. An apparatus as defined in claim 7 wherein said second ignitable material is located outside said chamber in a housing having a cylindrical side wall, a first end wall and a second end wall, said first end wall of said housing comprising said rupturable container wall, said second end wall of said housing having gas flow opening means for communicating the interior of said housing with the exterior of said housing.

9. An apparatus as defined in claim 1 wherein said inflatable device is a vehicle occupant restraint, and wherein said apparatus further comprises means for sensing a predetermined amount of deceleration of a vehicle and for igniting said second ignitable material in response to said sensing.

10. An apparatus for inflating an inflatable device, said apparatus comprising:
container means for defining a chamber, said container means having a rupturable wall, said chamber containing a first ignitable material and gas;
directing means for directing gas from said container means to the inflatable device when said rupturable wall is ruptured; and
initiator means for rupturing said rupturable wall and for igniting said first ignitable material, said initiator means including a second ignitable material, said second ignitable material producing a pressure wave and products of combustion when ignited which first rupture said rupturable wall and then cause ignition of said first ignitable material;
said first ignitable material in said chamber comprising a flammable fuel gas, said apparatus further comprising an oxidizer in said chamber.

11. An apparatus as defined in claim 10 wherein the inflatable device comprises an air bag for restraining a vehicle occupant when inflated.

12. An apparatus for inflating an inflatable device, said apparatus comprising:
container means for defining a chamber, said container means having a rupturable wall, said chamber containing a first ignitable material and gas;
directing means for directing gas from said container means to the inflatable device when said rupturable wall is ruptured; and
initiator means for rupturing said rupturable wall and for igniting said first ignitable material, said initiator means including a second ignitable material, said second ignitable material producing a pressure wave and products of combustion when ignited which first rupture said rupturable wall and then cause ignition of said first ignitable material;
said first ignitable material in said chamber comprising a combustible metallic wire, said apparatus further comprising an oxidizer in said chamber.

13. An apparatus as defined in claim 12 wherein the inflatable device comprises an air bag for restraining a vehicle occupant when inflated.

14. An apparatus for inflating an inflatable device, said apparatus comprising:
container means for defining a chamber, said container means having a rupturable wall, said chamber containing a first ignitable material and gas;
directing means for directing gas from said container means to the inflatable device when said rupturable wall is ruptured; and
initiator means for rupturing said rupturable wall and for then igniting said first ignitable material, said initiator means including a second ignitable material, said second ignitable material producing a pressure wave and products of combustion when ignited which rupture said rupturable wall and ignite said first ignitable material.

15. An apparatus as defined in claim 14 wherein said second ignitable material is located outside said chamber.

16. An apparatus as defined in claim 14 wherein said first ignitable material in said chamber comprises a flammable fuel gas, and wherein said apparatus further comprises an oxidizer in said chamber.

17. An apparatus as defined in claim 14 wherein said first ignitable material in said chamber comprises a combustible metallic wire, and wherein said apparatus further comprises an oxidizer in said chamber.

18. An apparatus as defined in claim 14 wherein said first ignitable material in said chamber comprises a gas generating solid material, and wherein said apparatus further comprises an oxidizer in said chamber.

19. An apparatus as defined in claim 14 wherein said initiator means includes a tubular casing having a first open end and a second open end, said second ignitable material being contained in said casing and having a first surface facing outward of said first open end and a second surface facing outward of said second open end, said initiator means further including means for igniting said second ignitable material at said second surface, and said initiator means supporting said casing in a position with said first surface facing said rupturable wall of said container means.

20. An apparatus as defined in claim 19 wherein said first surface is larger than said second surface.

21. An apparatus as defined in claim 14 wherein said second ignitable material is formed as a shaped charge having a surface means for causing said pressure wave to concentrate and propel said products of combustion along an axis, said initiator means further comprising a liner means received over said surface means, said linear means being deformable by said pressure wave into the form of a jet movable by said pressure wave along said axis to penetrate said rupturable wall of said container means.

22. An apparatus as defined in claim 14 wherein said second ignitable material is formed as a shaped charge having a surface means for causing said pressure wave to concentrate and propel said products of combustion along an axis in the form of a jet which penetrates said rupturable wall of said container means.

23. An apparatus as defined in claim 22 wherein said second ignitable material is located outside said chamber in a housing having a cylindrical side wall, a first end wall and a second end wall, said first end wall of said housing comprising said rupturable wall of said container means, said second end wall of said housing having gas flow opening means for communicating the interior of said housing with the exterior of said housing.

24. An apparatus as defined in claim 14 wherein said inflatable device is a vehicle occupant restraint, and wherein said apparatus further comprises means for sensing a predetermined amount of deceleration of a vehicle and for igniting said second ignitable material in response to said sensing.

* * * * *

UNITED STATES PATENT AND TRADEMARK OFFICE
CERTIFICATE OF CORRECTION

PATENT NO.  : 5,263,740

DATED       : November 23, 1993

INVENTOR(S) : Stuart M. Frey, Paul S. Headley, John H. Semchena, Richard J.
              Thompson, Ernst M. Faigle and Gregory B. Grace It is certified that error appears in the above-identified patent and that said Letters Patent is hereby corrected as shown below:

Column 14, line 67, change "2" to --1--.

Column 16, line 52, change "linear" to --liner--.

Signed and Sealed this

Third Day of May, 1994

Attest:

BRUCE LEHMAN

Attesting Officer

Commissioner of Patents and Trademarks